United States Patent
Umeda et al.

(10) Patent No.: US 6,318,072 B1
(45) Date of Patent: Nov. 20, 2001

(54) APPARATUS FOR REDUCING NOISE PRODUCED BY SUPERSONIC JET

(75) Inventors: Yoshikuni Umeda; Ryuji Ishii, both of Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 09/334,259

(22) Filed: Jun. 16, 1999

(30) Foreign Application Priority Data

Jun. 18, 1998 (JP) .................................................. 10-171241

(51) Int. Cl.$^7$ .......................................................... F02K 1/00
(52) U.S. Cl. .................................................................. 60/271
(58) Field of Search ............................ 60/271, 221, 39.5; 239/265.11, 171, 265.13; 181/213, 214, 255

(56) References Cited

U.S. PATENT DOCUMENTS

| | | |
|---|---|---|
| 4,044,203 | 8/1977 | Swinbanks . |
| 4,494,625 * | 1/1985 | Mathes ................................. 181/213 |
| 5,520,459 * | 5/1996 | Yu et al. ............................... 366/336 |
| 5,530,214 * | 6/1996 | Morehead et al. .................... 181/255 |
| 5,821,475 * | 10/1998 | Morehead et al. .................... 181/255 |

FOREIGN PATENT DOCUMENTS

| | | |
|---|---|---|
| A-49-97601 | 9/1974 | (JP) . |
| A-51-126437 | 11/1976 | (JP) . |

* cited by examiner

Primary Examiner—Charles G. Freay
Assistant Examiner—W. Rodriguez
(74) Attorney, Agent, or Firm—Oliff & Berridge, PLC

(57) ABSTRACT

An apparatus for reducing noise reduction produced by a super sonic jet, comprises a cavity tone generator provided near an exit of a supersonic jet nozzle. The cavity tone generator is a cavity formed in an inner wall of the nozzle exit, and the cavity having a lateral cross-sectional shape similar to a lateral cross-sectional shape of the inner wall of the nozzle exit. More preferably, the cavity and the nozzle exit are formed to have a rectangular lateral cross-sectional shape.

5 Claims, 4 Drawing Sheets

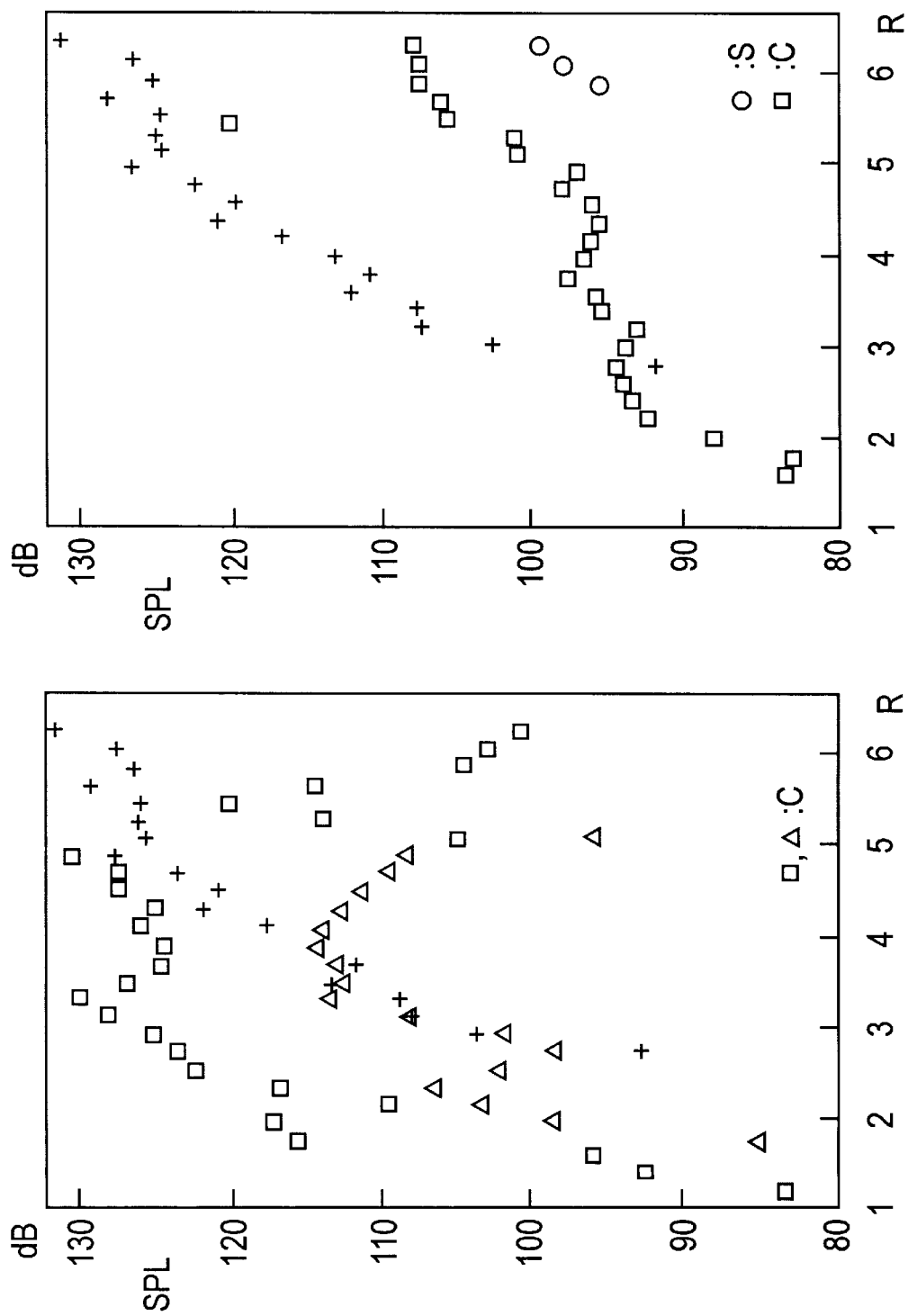

APPARATUS FOR REDUCING NOISE PRODUCED BY SUPERSONIC JET

BACKGROUND OF THE INVENTION

1. Field of the Invention

This invention relates to an apparatus for reducing noise generated by a supersonic jet.

2. Description of Related Art

For a supersonic jet airplane, the thrust force is generated by the reaction of the exhausting of supersonic jet issuing from supersonic jet engines. When a silencer is not provided to the jet engine installed on the supersonic jet airplane, there is fear that very high level noise, which is called screech tone, is generated outside a nozzle of the jet engine by a supersonic jet exhausted from the nozzle. The screech tone causes high level noise in an airport and its surrounding, and when a structure of the airplane is exposed to the strong screech tone for a long time, there is fear that metallic aircraft structure can be destroyed. As is known in the art, the screech tone is generated by a self-sustained oscillation of jets caused by a feedback loop consisting of downstream-convecting large scale coherent eddies around the supersonic jet and upstream-propagating acoustic waves in the ambient.

Recently, several investigations in reduction of supersonic jet noise have been carried out. As a result, it is known that providing small projection within nozzle exit of a jet engine is effective to reduce the screech tone. However, this apparatus for supersonic jet engine reduces the screech tone by merely regulating or fairing a supersonic jet flow utilizing the small projection at the exit of the supersonic jet nozzle, and therefore sufficiently noise reduction could not be obtained. Thus, inventors have studied to develop a new type apparatus for reducing the screech tone on the basis of the entirely different principle from the prior art.

SUMMARY OF THE INVENTION

It is therefore an object of the present invention to provide a noise reduction apparatus which is capable to reduce a screech tone generated by a supersonic jet efficiently by means of a simple structure.

According to one aspect of the present invention, an apparatus for reducing a screech tone generated by a supersonic jet, comprises:

a cavity tone generator provided at a neighborhood of an outlet of a supersonic jet nozzle.

In the screech tone reducing apparatus according to the invention, said cavity tone generator is provided near the exit of the supersonic jet nozzle such that a supersonic jet is passed through the cavity tone generator, and therefore the cavity tone is generated from the cavity tone generator. By suitably designing a configuration and a size of the cavity tone generator, it is possible to generate the cavity tone which interferes with the screech tone. As the result, the undesired screech tone can be reduced efficiently. The inventors have conducted various experiments, and have found that in a whole supersonic region, sound pressure level of the screech tone can be reduced than that when a silencer is not provided on the supersonic jet nozzle.

In a preferable embodiment of the screech tone reducing apparatus according to the present invention, the cavity tone generator is a cavity formed in an inner wall of the nozzle exit, said cavity having a lateral cross-sectional shape similar to a lateral cross-sectional shape of the inner wall of the nozzle exit.

In this embodiment, the cavity tone generator is constructed by the cavity formed in the inner wall of the exit of the nozzle, and a cross-sectional shape of the cavity is similar to a cross-sectional shape of the exit of the nozzle.

According to the present invention, it is preferable that the cavity and the nozzle outlet are formed to have a rectangular lateral cross-sectional shape. Also in this case, the screech tone can be sufficiently reduced.

The present invention also relates to a supersonic jet nozzle for ejecting a supersonic jet.

According to the invention, a supersonic jet nozzle for ejecting a supersonic jet comprises:

a nozzle main body having formed therein a passage for ejecting a supersonic jet; and a cavity tone generator composed of a cavity formed in an inner wall of the nozzle main body defining said passage.

BRIEF DESCRIPTION OF THE DRAWING

FIG. 1b is a side view watched from the direction of the arrow A in FIG. 1a;

FIGS. 3a and b are results illustrating sound pressure level (SPL) of cavity tone and screech tone corresponding to FIG. 2b and FIG. 2c, respectively.

DETAILED DESCRIPTION OF THE PREFERRED EMBODIMENT

Figure 1A:
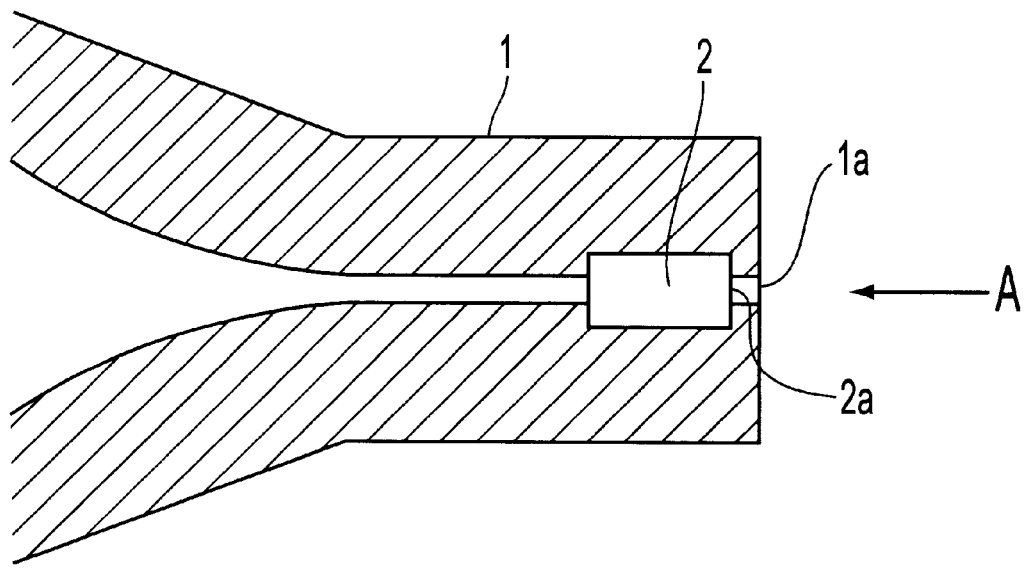
FIG. 1a is a schematic sectional view showing the construction of a first embodiment of the screech tone reducing apparatus according to the invention.

Now the present invention will be explained in detail with reference to embodiments shown in the drawings.

Figure 1B:
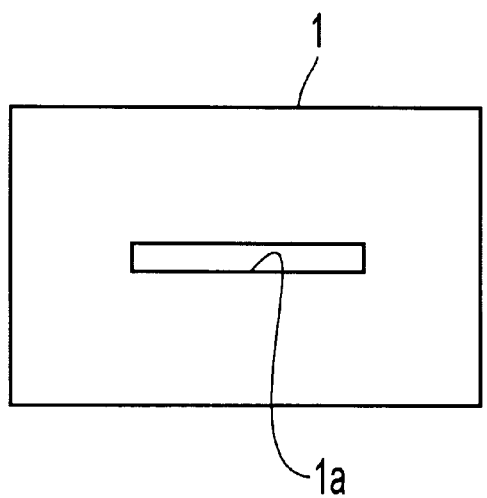

FIG. 1a is a schematic sectional view showing the structure of an embodiment of the apparatus for reducing noise generated by a supersonic jet according to the invention. FIG. 1a is a longitudinal cross section cut along a direction in which the supersonic jet flows through a supersonic jet nozzle 1, and FIG. 1b is a side view of the nozzle viewed in the direction shown by an arrow A in FIG. 1a.

In this embodiment, a cavity tone generator 2 is provided within a neighborhood of the exit of the supersonic jet nozzle 1 as shown in FIG. 1a. From a viewpoint of confirmation of noise reduction effect, a lateral cross-sectional shape of the cavity tone generator 2 cut along a plane perpendicular to the longitudinal plane of FIG. 1a is similar to a lateral cross-sectional shape of the supersonic jet nozzle 1. That is to say, in this embodiment, the nozzle 1 is formed to have a rectangular passage formed in a nozzle main body and the cavity tone generator 2 is formed in an inner wall defining said passage of the nozzle 1 to have a similar rectangular lateral cross sectional configuration. Therefore, the cavity tone generator 2 has an exit opening 2a which is identical with the lateral cross-sectional shape of the passage of the supersonic jet nozzle 1. Furthermore, the supersonic jet nozzle 1 has an exit opening 1a having the identical rectangular shape.

In a numerical example of a experimental model, the size of cross-sectional shape of the opening 1a of the nozzle 1 and the opening 2a of the cavity tone generator 2 are 2 mm in height and 20 mm in width, and the height of the cavity tone generator 2 is 6 mm. The cavity tone generator has a length of 12 mm viewed in the horizontal direction in FIG. 1a.

In the apparatus according to the invention, when the supersonic jet passes through the cavity 2, a cavity tone is generated. A frequency of the cavity tone is determined by a height and a length of the cavity. This has been disclosed in "Prediction of Oscillation Frequencies for Unstable Flow Past Cavities", D. Rockwell, Transactions of the ASME, June 1977, pp. 294–300. The thus generated cavity tone is radiated from the supersonic jet nozzle and interferes with the screech tone to reduce the sound pressure level of the screech tone.

Now the effects of the screech tone reducing apparatus according to the invention will be explained with reference to experimental results obtained by the aforementioned experimental model.

Figures 2A, 2B, 2C:
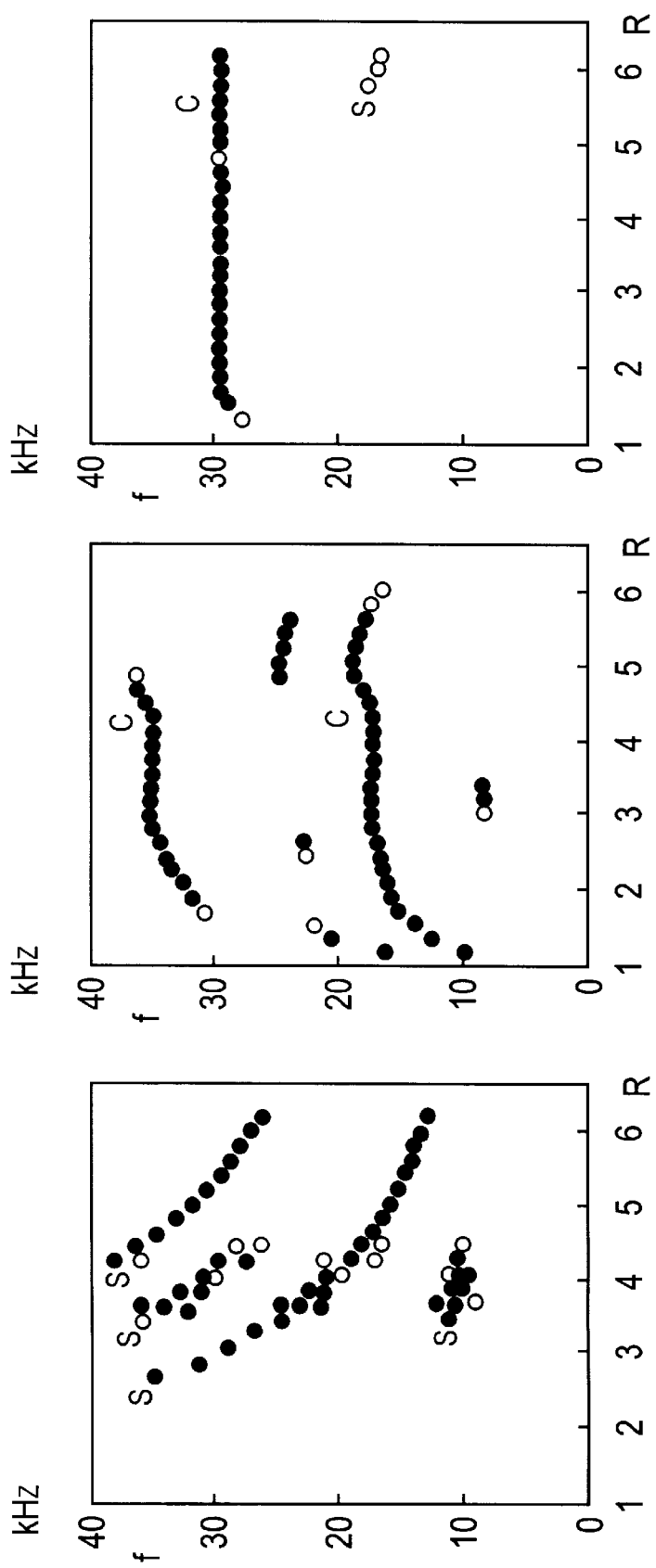
FIG. 2a is an experimental result showing a relationship between a frequency of screech tone and the pressure ratio of a supersonic jet when the jet is exhausted from the nozzle without a cavity tone generator.
FIG. 2b is a result representing a relationship between a frequency of cavity tone and the pressure ratio of a supersonic jet when a cavity tone generator is provided downstream of the nozzle exit.
FIG. 2c is a result expressing a relationship between a frequency of cavity tone and screech tone and the pressure ratio of a supersonic jet when the cavity tone generator is provided in an outlet of a supersonic jet nozzle according to the invention.

FIG. 2a to c are experimental results showing a relationship between a frequency of the screech tone S and cavity tone C and the pressure ratio R of supersonic jet. The pressure ratio R is represented by a ratio of a pressure in a compressed gas reservoir tank to the atmospheric pressure. In FIGS. 2a–2c, solid circles shows relatively strong tone, and open circles denote weak tone.

FIG. 2a shows a relationship between a frequency f of the screech tone S and the pressure ratio R, when a supersonic free jet is issued from the rectangular jet nozzle in which or to which no cavity tone generator is provided. As shown in FIG. 2a, strong screech tones having various frequency components are generated.

FIG. 2b is a experimental result showing a relationship between a frequency f of the cavity tone C and the pressure ratio R of supersonic jet under such a condition that the cavity tone generator is provided external to the rectangular supersonic jet nozzle. In this case, a screech tone is not produced, but cavity tone is generated.

FIG. 2c is a result showing a relationship between a frequency of the cavity tone C and the jetting pressure ratio R of supersonic jet in the screech tone reducing apparatus according to the invention realized or exemplified in the above mentioned experimental model, in which the cavity tone generator is formed in the exit of supersonic jet nozzle.

As can be understood from FIG. 2c, a remaining cavity tone is outside the audible frequency range.

FIGS. 3a and b are experimental results showing sound pressure level (SPL) of the cavity tone and screech tone corresponding to the experiments shown in FIG. 2b and FIG. 2c, respectively. In FIGS. 3a and 3b, sound pressure level of screech tone is indicated by circle, that of cavity tone square and triangle. In addition, cross in FIG. 3 shows the sound pressure level of the screech tone radiated from the supersonic free jet corresponding to the case of FIG. 2a.

It can be seen from FIG. 3a that the SPL of the cavity tone is higher than that of a screech tone in the region of the jet pressure ratio R less than 5, when the supersonic jet is issued from the rectangular supersonic jet nozzle outside of which is arranged the cavity tone generator.

On the other hand, it can be seen from FIG. 3b, the SPL of the cavity tone is lower than that of the screech tone in the whole range of the pressure ratio R. Especially when R is larger than 4, the SPL of the cavity tone is lower than that of the screech tone by 20 dB at most. In this manner, it has been confirmed that remarkable noise reduction effect can be obtained by the apparatus according to the invention.

Figure 4B:
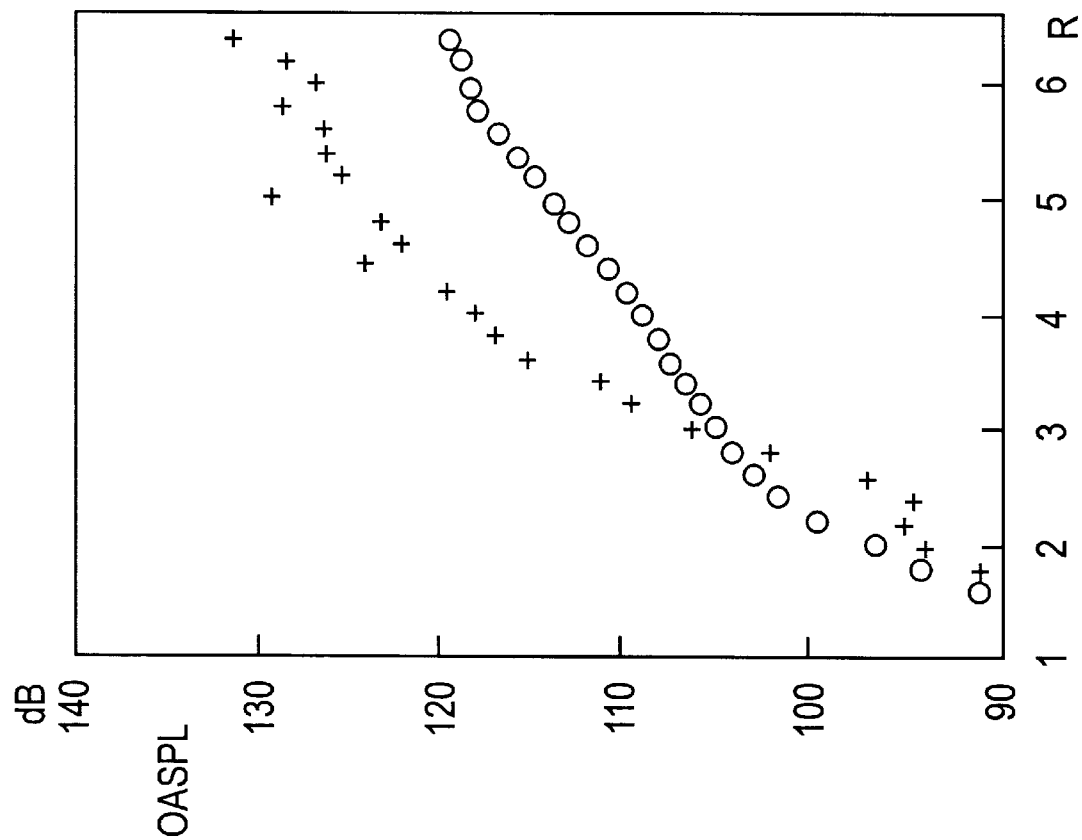
FIGS. 4a and b are results depicting over-all frequency sound pressure level (OASPL) corresponding to FIG. 2b and FIG. 2c, respectively.
Figure 4A:
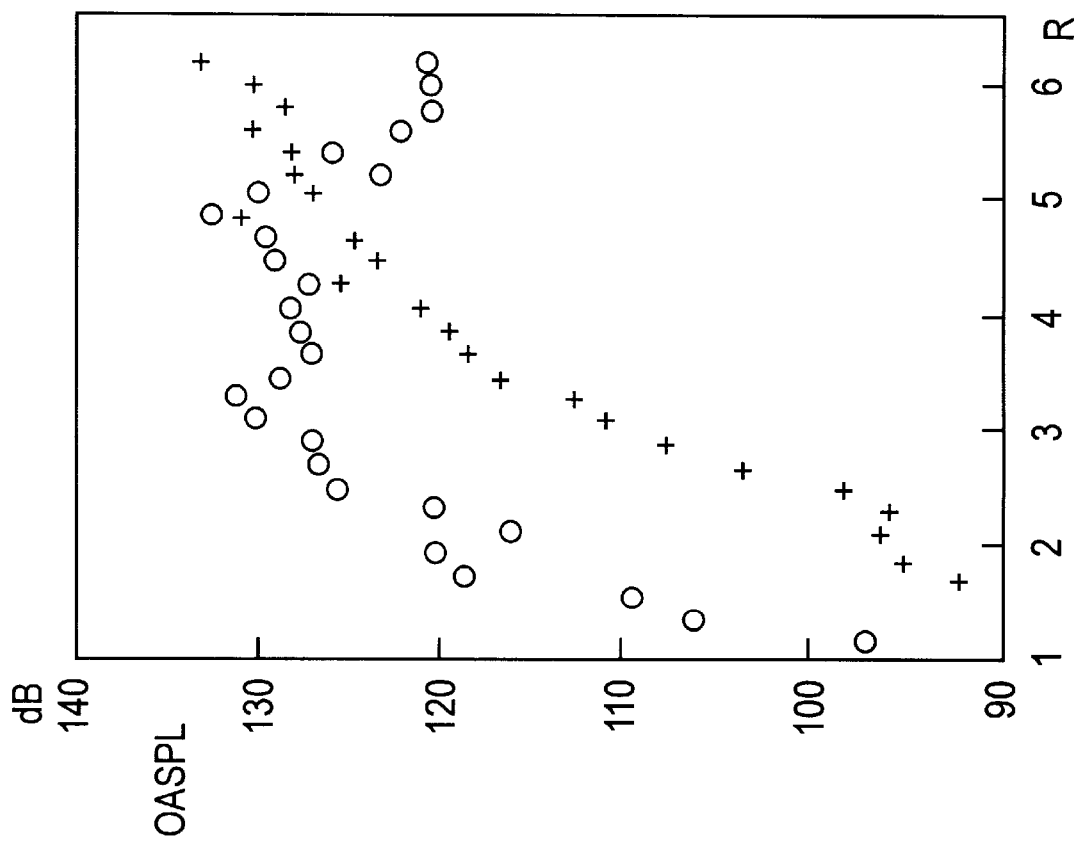

FIGS. 4a and 4b are experimental results showing overall sound pressure level (OASPL) of the sound corresponding to the cases of FIG. 2b and FIG. 2c, respectively. In FIG. 4, OASPL value when the cavity tone generator is provided, is indicated by circle. In addition, cross in FIG. 4 shows the OASPL value when the cavity tone generator is not provided.

It can be seen from FIGS. 4a and 4b that although a difference in OASPL value of high level noise between the case in which the cavity tone generator is not provided and the case in which the cavity tone generator is provided, is smaller than that in the SPL value between the case shown in FIG. 3a and the case illustrated in FIG. 3b, tendency of variation in OASPL in accordance with R is similar to that in the above mentioned SPL value. The most excellent noise reduction of the OASPL value is obtained when the cavity tone generator is provided within the supersonic jet nozzle according to the invention.

Therefore, the apparatus for reducing the screech tone caused by the issuing of the supersonic jet from the nozzle according to the invention can reduce effectively the strong screech tone although the apparatus has a relatively simple structure. Therefore, the present invention can be usefully applied to a jet engine of supersonic jet airplane. That is to say, when the noise reduction apparatus according to the invention is applied to a supersonic jet engine to produce a thrust force of supersonic jet airplane of the next generation now under research and development, it is possible to reduce an extremely strong screech tone generated by the supersonic jet. Then, not only noise level around an airport will be reduced, but also the fatigue failure for metallic aircraft structure due to the exposure to the strong screech tone can be avoided.

It should be noted that the apparatus for reducing noise generated by a supersonic jet according to the invention may be applied to various kinds of equipment using the supersonic jet in the field of aerospace engineering, fluid mechanics, aeroacoustics and so on.

As explained above, the noise reducing apparatus with simple structure according to the invention can effectively reduce the serious screech tone generated by supersonic jets on the basis of a principle entirely different from the known principles.

What is claimed is:

1. An apparatus for reducing noise produced by a supersonic jet, the supersonic jet including a supersonic jet nozzle having an exit, comprising:

means for generating a cavity tone that interferes with, and reduces screech tone caused by emission through the supersonic jet nozzle by virtue of the disposition of the means for generating relative to the exit of the supersonic jet nozzle, the means for generating being located upstream of the nozzle exit.

2. A noise reduction apparatus according to claim 1, wherein said means for generating is a cavity formed in an inner wall of the nozzle exit, said cavity having a lateral cross-sectional shape similar to a lateral cross-sectional shape of the inner wall of the nozzle exit.

3. A noise reduction apparatus according to claim 2, wherein said cavity and said nozzle exit are formed to have a rectangular lateral cross-sectional shape.

4. A supersonic jet nozzle for exhausting a supersonic jet comprising:

a nozzle main body having an inner wall that defines a passage for exhausting a supersonic jet; and means for generating a cavity tone that interferes with, and reduces screech tone caused by emission through the supersonic jet nozzle, the means for generating being defined by a cavity formed in the inner wall of the nozzle main body defining said passage, the means for generating being located upstream of the nozzle exit.

5. An apparatus for reducing noise produced by a supersonic jet, the supersonic jet including a supersonic jet nozzle having an exit, comprising:

a cavity tone generator disposed upstream of the nozzle exit of the supersonic jet nozzle;

wherein said cavity tone generator is a cavity formed in an inner wall of the nozzle exit, said cavity having a lateral cross-sectional shape similar to a lateral cross-sectional shape of the inner wall of the nozzle exit; and wherein said cavity and said nozzle exit are formed to have a rectangular lateral cross-sectional shape.

* * * * *